United States Patent [19]
Falchle

[11] 3,945,653
[45] Mar. 23, 1976

[54] HOLDER FOR TOOLS AND SIMILAR OBJECTS

[75] Inventor: Jörg Falchle, Bempflingen, Germany

[73] Assignee: Robert Bosch GmbH, Stuttgart, Germany

[22] Filed: Oct. 15, 1974

[21] Appl. No.: 514,918

[30] Foreign Application Priority Data
Oct. 30, 1973   Germany............................ 2354168

[52] U.S. Cl...................... 279/97; 279/1 B; 279/76
[51] Int. Cl.² ........................................ B23B 31/10
[58] Field of Search.......... 408/239; 279/86, 97, 1 B, 279/20, 22, 24, 30, 75, 76; 81/52.3

[56] References Cited
UNITED STATES PATENTS

| 829,153 | 8/1906 | Hollm .................................. 279/75 |
| 2,667,357 | 1/1954 | Andreasson ..................... 279/97 X |
| 2,854,238 | 9/1958 | Kennell.............................. 279/75 X |
| 3,726,533 | 4/1973 | Lafferty, Sr............................ 279/97 |

FOREIGN PATENTS OR APPLICATIONS

| 593,864 | 10/1947 | United Kingdom................... 279/75 |
| 211,629 | 10/1960 | Austria ................................. 279/75 |

*Primary Examiner*—Willie G. Abercrombie
*Assistant Examiner*—W. R. Briggs
*Attorney, Agent, or Firm*—Michael J. Striker

[57] ABSTRACT

A tube has an open end and an outer circumference and is formed with a transverse incision which extends inwardly towards the axis and is inclined longitudinally of the tube towards the open end of the latter. A sleeve surrounds the tube with clearance and is formed in its inner circumference with a substantially radial slot. A cylindrical locking member extends normal to the axis of the tube through the incision, being freely slidable therein, and has end portions projecting beyond the tube into the slot. A biasing spring normally biases the sleeve to a position relative to the tube in which the locking member is prevented from sliding in the incision because of the fact that its end portions are received in the slot of the sleeve, until the sleeve is displaced axially of the tube against the force of the biasing spring to a position in which the locking member can freely slide in the incision.

9 Claims, 4 Drawing Figures

HOLDER FOR TOOLS AND SIMILAR OBJECTS

BACKGROUND OF THE INVENTION

The present invention relates generally to a tool holder, and more particularly to a holder for tools and similar objects having a shank provided with a transverse groove. Still more particularly, the invention relates to a holder which is especially suitable for holding tools in a power tool, such as a drill or a power chisel.

Various types of tool holders to hold a tool bit to the housing of a power tool, are already known. Many of these employ the conventional jaw-type chuck. Another prior-art construction utilizes, in the context of a pneumatic hammer, a tool holder in which a plurality of spherical locking elements extend into associated recesses formed in the shank of a tool bit. A slidable sleeve can be moved to and from a position in which it prevents the displacement of the spherical locking elements out of the associated recesses, thus holding the tool bit in place. The shank of the tool bit is receivable in a holding tube and the sleeve surrounds this tube which is formed with appropriate cutouts through which these spherical elements can yield in radially outwardly direction unless they are prevented from so doing by the presence of the sleeve. A mounting ring is provided which prevents unintentional or undesired removal of the sleeve from the tube.

However, this last-described prior-art construction has disadvantages, not the least of which is the fact that the surface-to-surface contact between these spherical locking elements and the shank of the tool bit is very small so that high pressures must be transmitted between the contacting surfaces via these very small points of contact, which leads to very rapid and pronounced wear and/or strong deformation of the contacting surfaces. Moreover, this prior-art construction is quite complicated and therefore expensive to produce and difficult to maintain.

SUMMARY OF THE INVENTION

Accordingly, it is a general object of the present invention to provide an improved holder for tools and similar objects which avoids the disadvantages of the prior art.

More particularly, it is an object of the invention to provide such an improved holder which is quite simple in its construction and can therefore be inexpensively produced and maintained.

Another object of the invention is to provide such an improved holder wherein the wear of the various components is significantly reduced thus assuring a longer life for the holder without the necessity for repairs or replacements of components.

In keeping with these objects, and with others which will become apparent hereafter, one feature of the invention resides in a holder for tools and similar objects having a shank provided with a transverse groove. Briefly stated, the holder comprises a tube having an open end and an outer circumference. Th tube is formed with an incision transversely of its axis and the incision extends inwardly towards the axis and is inclined longitudinally of the tube towards an end of the same. A sleeve surrounds the tube with clearance and has an inner circumference formed with a substantially radial slot. A substantially cylindrical locking member extends through the incision substantially normal to the axis of the tube and is freely slidable in the incision. The locking member has end portions which project beyond the outer circumference of the tube and which are guided in the slot. The locking member is adapted to enter into the groove of a shank upon axial insertion of the shank through the open end of the tube, and the locking member can move in direction radially outwardly away from the axis of the tube when the sleeve is shifted longitudinally of the tube to a position which will permit free sliding of the locking member in the incision.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
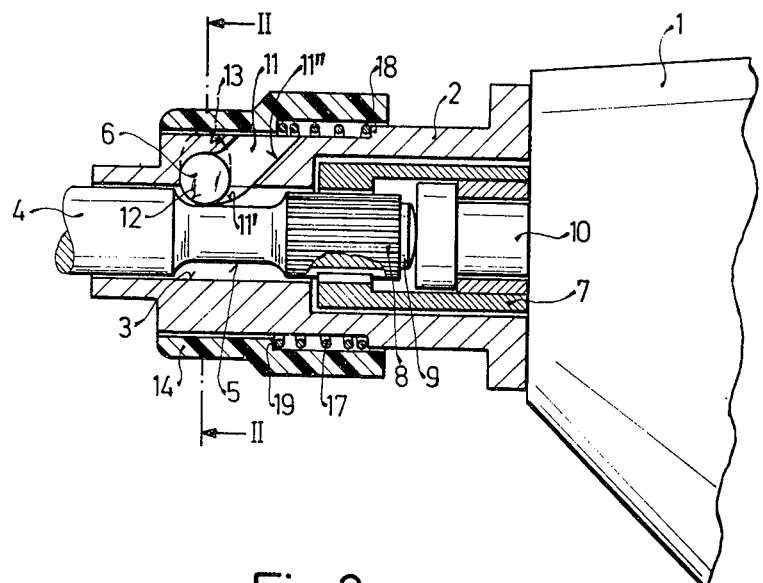
FIG. 1 is an axial section through one embodiment of a tool holder according to the present invention.
Figure 2:
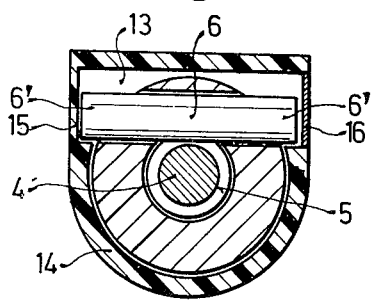
FIG. 2 is a section taken on line II—II of FIG. 1.

Referring now in detail to the drawing, and firstly to the embodiment that is illustrated in FIGS. 1 and 2, it is emphasized that reference numeral 1 only fragmentarily identifies a housing of a power tool, for example, in the illustrated embodiment a hammer drill. Hammer drills are well known in the art and it is their purpose to impart both rotary motion to a drill bit and also to impart axially acting impacts to the drill bit, so that the latter will exert a drilling action combined with a hammering action upon the workpiece.

The holder according to the present invention comprises a mounting tube or guide tube 2 which is appropriately secured (not shown, but conventional) to the housing 1 so as to be fixedly connected with the same. The tube 2 has a concentric bore 3 into which the shank 4 of a tool, in this instance a drill bit is inserted through the open end of the tube 2. The shank 4 in this embodiment is formed with a groove extending transverse to its longitudinal axis; in the illustrated embodiment this is a circumferentially extending groove 5. To retain the shank 4 in the holder, a cylindrical locking member 6 is provided which can move into and out of the groove 5 and, when it is located in the groove 5, will prevent the movement of the shank 4 out of the tube 2. This is illustrated in FIGS. 1 and 2, it being evident that to be able to withdraw the shank 4 from the tube 2 the locking element 6 would have to move outwardly away from the axis of the tube 2 and out of the groove 5.

The inner end of the shank 4 is formed with flutes or splines 8 which engage with corresponding components of a rotating member 7 that is driven in rotation by the non-illustrated drive within the housing 1, thus rotating the shank 4. The right-hand end of the shank 4 is convex as indicated by reference numeral 9, and is so positioned that it can be impacted by an impactor 10 which exerts consecutive axial blows upon the shank 4 (acting in the direction towards left-hand side of FIG. 1) under the influence of the mechanism provided in the housing 1 and which forms no part of the invention.

The tube 2 is formed with an incision 11 transverse to its elongation and extending inwardly towards the axis of the tube from the outer circumference of the same. The locking member 6, whose cylindrical shape is clearly evident from a comparison of FIGS. 1 and 2, extends normal to the longitudinal axis of the tube 2 and of the shank 4. It is also clear from a comparison of FIGS. 1 and 2 that the incision 11 is open at opposite lateral sides of the tube 2 and that the end portions 6' of the locking member 6 project outwardly beyond the circumference of the tube 2. The width of the incision 11 is sufficiently large to permit unhindered movement of the locking member 6 along the incision 11 from the outer towards the inner end of the latter, the inner end being identified with reference numeral 12. It will be noted that the incision has an inner end portion adjacent the inner end 12, and an outer end portion extending from the inner end portion to the outer circumference of the tube 2. The inner end portion is identified with reference numeral 11' and extends parallel to the axis of the tube 2 whereas the outer end portion 11" is inclined at an acute angle to a tangential plane of the tube 2 and in direction away from the open end of the tube 2 through which the shank 4 is insertable.

The tube 2 is surrounded by an axially slidable sleeve 14 the inner circumference of which is formed with an elongated radial slot 13 into which the end portions 6' of the locking elements 6 extend. The slot 13 extends towards but terminates short of the outer circumference of the sleeve 10 so that the slot is closed adjacent one end portion 6' by the wall portion 15 of the sleeve 14 and adjacent the other end portion 6' by a pressed-in cover 16. The purpose of the latter is, of course, to permit access to the locking member 6 upon removal of the cover 16. The sleeve 14 is advantageously of synthetic plastic material as illustrated, and it is urged to the position shown in FIG. 1 by a helical expansion spring 17 which reacts against a shoulder 18 at the exterior of the tube 2 and a shoulder 19 at the interior of the sleeve 14. In the position illustrated in FIGS. 1 and 2, the locking member 6 which is guided and taken along by the sleeve 14 due to the fact that its end portion 6 extends into the slot 13, is located in the portion 11' of the incision 11, and also is located in the groove 5 of the shank 4, thereby preventing withdrawal of the shank 4.

The position shown in FIGS. 1 and 2 is the position that is normally assumed by the locking member 6, even when there is no shank 4 present in the tube 2. If, therefore, the tool holder is to be placed into use by insertion of a shank 4, the shank will be pushed into the bore 3 of the tube 2 until the end 9 abuts against the locking member 6. It will now be necessary to exert additional force to further insert the shank 4, and this additional force causes the locking member 6 to be shifted towards the right within the portion 11' of the incision 11, and in so doing its end portion 6' which are guided in the slot 13 push the sleeve 14 towards the right in FIG. 1 against the force of the biasing spring 17. This continues until the locking member 6 reaches a position at which it can enter into the portion 11" of the incision 11, and the locking member 6 will now proceed to move in radially outward direction in the portion 11" until the outer circumference of the shank 4 can slide beneath the locking member 6 in the groove 3. The locking member 6 will ride on the outer circumference of the shank 4 until it becomes located oppositely the groove 5 and can now shift back inwardly towards the axis of the tube 2, which it proceeds to do under the urging of the biasing spring 17 which shifts the sleeve 14 towards the left until it again has reached the position shown in FIG. 1 in which the locking member 6 will have been guided back into the portion 11' of the incision 11 and will now be located within the groove 5. In this position the locking member 6 cannot yield again radially until the sleeve 14 is pulled towards the right, and thus the shank 4 is secured against removal from the bore 3 of the tube 2.

It should be noted that the axial length of the groove 5 is greater than the diameter of the locking member 6, thus permitting a certain amount of yielding of the shank 4 under the exertion of axially acting impacts, although this relationship need of course not be maintained if only rotary motion is to be transmitted to the shank 4. The locking member 6 evidently does not prevent rotation of the shank 4 since the groove 5 is a circumferential groove. The force required to overcome the force of the biasing spring 17 during insertion of the shank 4 into the bore 3 of the tube 2 amounts to only approximately 10% of the force which a user must exert via the housing 1 upon the drill bit having the shank 4; in other words, when the tool is in use pressure must be exerted upon the housing to press the drill bit having the shank 4 against the workpiece, and since this pressure is substantially greater than the force required to make the spring 17 yield and permit the sleeve 14 to move towards the right when the shank 4 is being inserted, it is clear that even if the shank 4 has been improperly inserted by an operator and is not properly locked for some reason, it will automatically move far enough inward to become locked by movement of the locking member 6 into the groove 5, when an operator exerts pressure upon the housing 1 and the drill bit in preparation for the initiation of work. It is therefore impossible for an operator to actually begin work on a workpiece without the tool bit having the shank 4 being properly locked to the tool holder.

Figure 3:
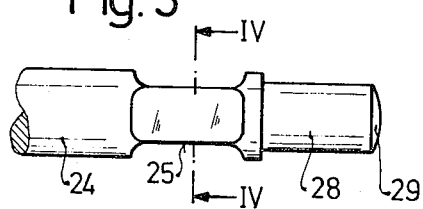
FIG. 3 is a fragmentary perspective showing a detail of the shank of a tool which can be held with the holder according to the present invention.
Figure 4:
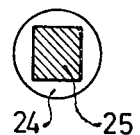
FIG. 4 is a section taken on line IV—IV of FIG. 3.

FIGS. 3 and 4 show a further embodiment. the shank 24 shown in FIGS. 3 and 4 is the shank of a chisel rather than of a hammer drill bit. In this embodiment, the groove 5 is formed by providing the shank 24 with a plurality of mutually inclined flat facet, of which four are provided in the illustrated embodiment. When the shank 24 is inserted into the holder of FIGS. 3 and 4 the locking member 6 will engage one of these flat facets 25 and thus prevent a turning of the shank 24 in the tube 2, it being evident that a turning is not desired if the shank 24 is a part of a chisel rather than of a drill bit. The rear end 29 of the shank 24 is also convex and engages the member 10 as in FIGS. 1 and 2. The portion 28 of the bit having the shank 24 is of cylindrical configuration, since it does not require the splines 8 of FIGS. 1 and 2. Its diameter corresponds to the core diameter of the portion having the splines 8 in FIG. 1, and therefore there will be no engagement between the portion 28 and the rotating element 7 so that the latter cannot damage the portion 28 or become damaged by the same, when the machine having the housing 1 is operated only for the transmission of axial blows, as would be the case in a chisel.

It will be understood that each of the elements described above, or two or more together, may also find a useful application in other types of constructions differing from the types described above.

While the invention has been illustrated and described as embodied in a holder for tools and similar objects, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A holder for tools and similar objects having a shank provided with a transverse groove, comprising, a tube having an open end and an outer circumference, said tube being formed with an incision transversely of its longitudinal axis and said incision extending inwardly towards said axis and being inclined towards an end of said tube; a sleeve surrounding said tube with clearance, having an inner circumference and being formed with a substantially chordal slot which extends from said inner circumference towards but terminates short of an outer circumference of said sleeve; and a substantially cylindrical locking member extending through said incision normal to the axis of said tube and being freely slidable in said incision, said locking member having end portions which project beyond said outer circumference of said tube and are guided in said slot, and said locking member entering into said groove of a shank upon axial insertion of the shank through said open end of said tube.

2. A holder as defined in claim 1, wherein said incision extends towards said open end of said tube.

3. A holder as defined in claim 1, said tube having an exterior abutment and said sleeve having an interior abutment; and further comprising spring means reacting against said abutments and urging said sleeve to a position in which said locking member is prevented from sliding in said incision.

4. A holder as defined in claim 1; and further comprising a tool having a shank formed with said groove, said groove having in axial direction of said shank a length which is greater than the diameter of said locking element.

5. A holder as defined in claim 1, wherein said groove is in part formed by at least one flat facet on said shank which prevents turning of the shank in said tube.

6. A holder as defined in claim 3, wherein said abutments are shoulders formed on said tube and sleeve, respectively.

7. A holder as defined in claim 3, wherein said spring means comprises a helical spring.

8. A holder as defined in claim 3, wherein said spring means comprises a helical expansion spring.

9. A holder for tools and similar objects having a shank provided with a transverse groove, comprising, a tube having an open end and an outer circumference, said tube being formed with an incision transversely of its longitudinal axis and said incision extending inwardly towards said axis and being inclined towards an end of said tube, said incision having an inner end region which extends parallel to a tangential plane of said tube, the remainder of siad incision extending at an acute angle to said tangential plane; a sleeve surrounding said tube with clearance, having an inner circumference and being formed with a substantially chordal slot; and a substantially cylindrical locking member extending through said incision normal to the axis of said tube and being freely slidable in said incision, said locking member having end portions which project beyond said outer circumference of said tube and are guided in said slot, and said locking member entering into said groove of a shank upon axial insertion of the shank through said open end of said tube.

* * * * *